Jan. 28, 1930.  J. N. BARTLETT  1,745,241
AMUSEMENT DEVICE
Filed May 10, 1928   3 Sheets-Sheet 2
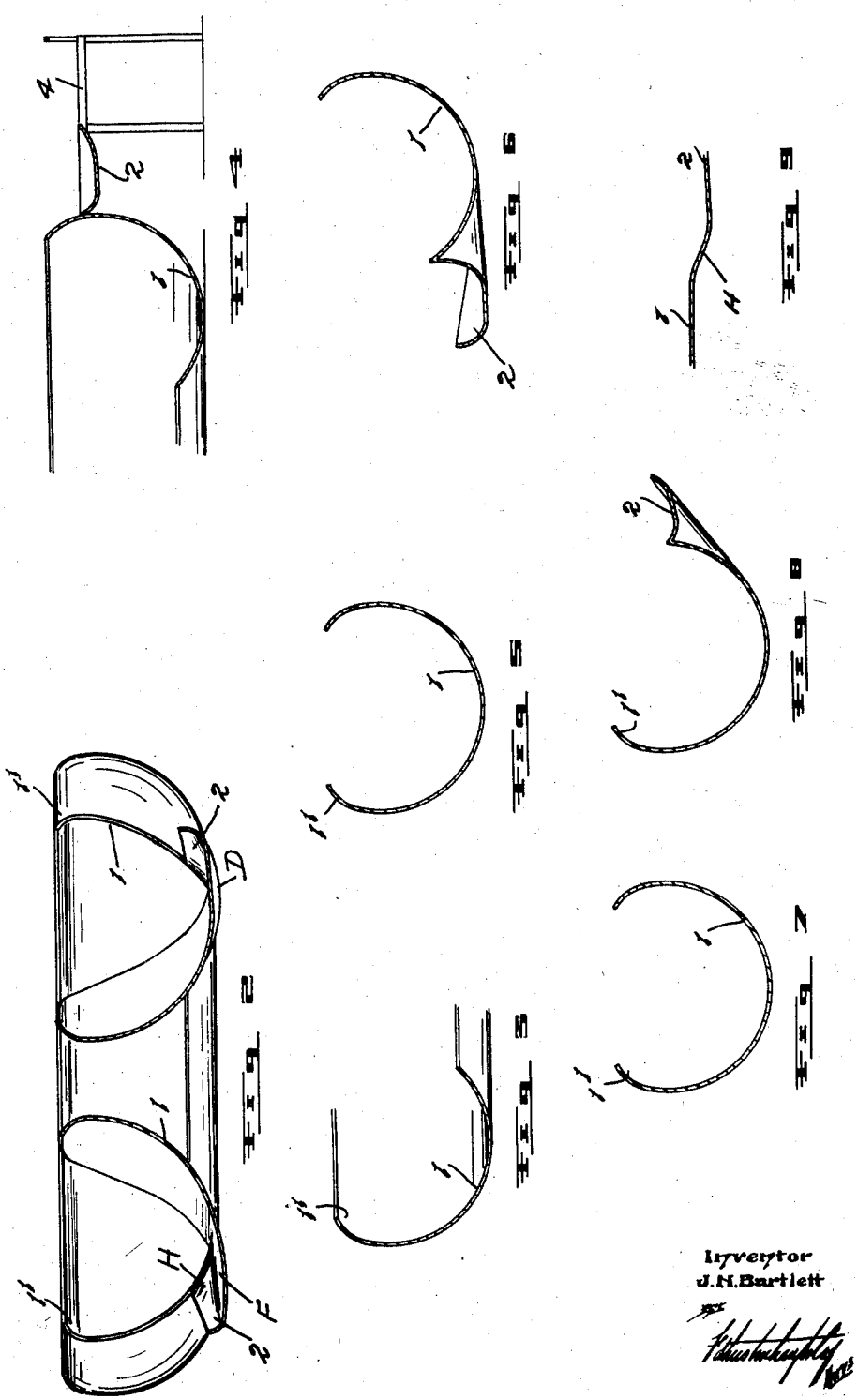
Inventor
J. N. Bartlett

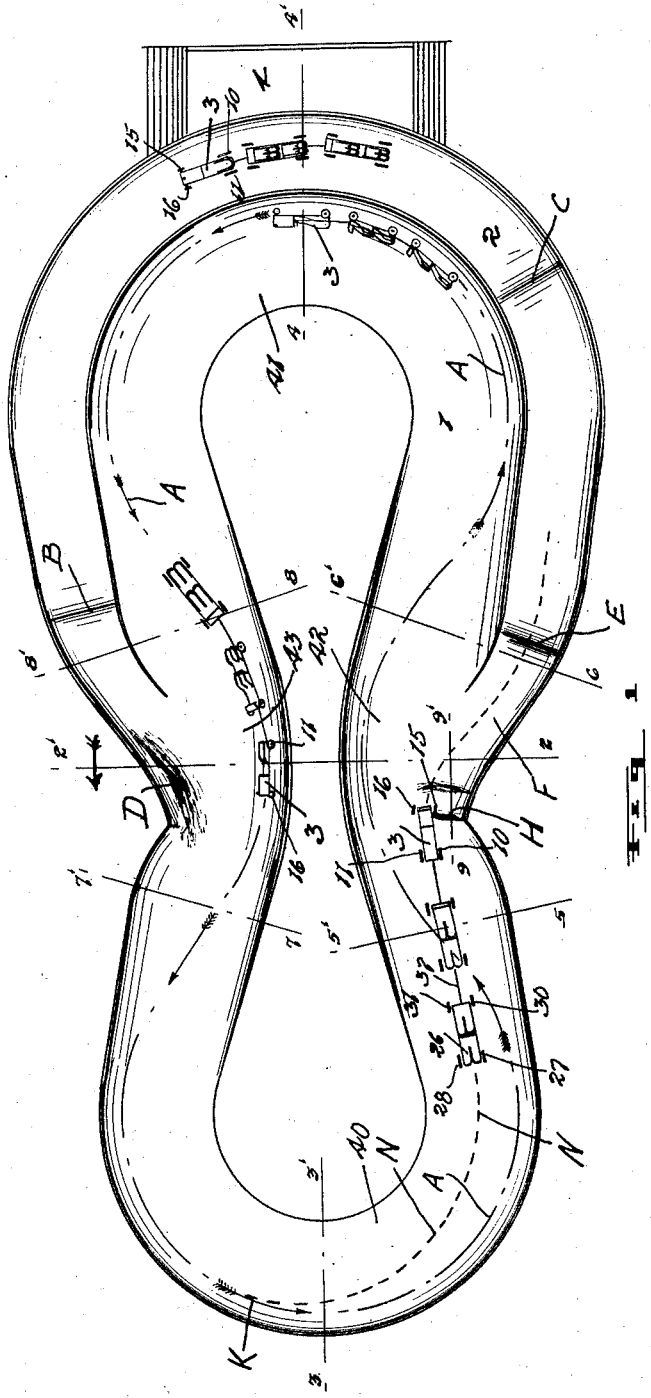

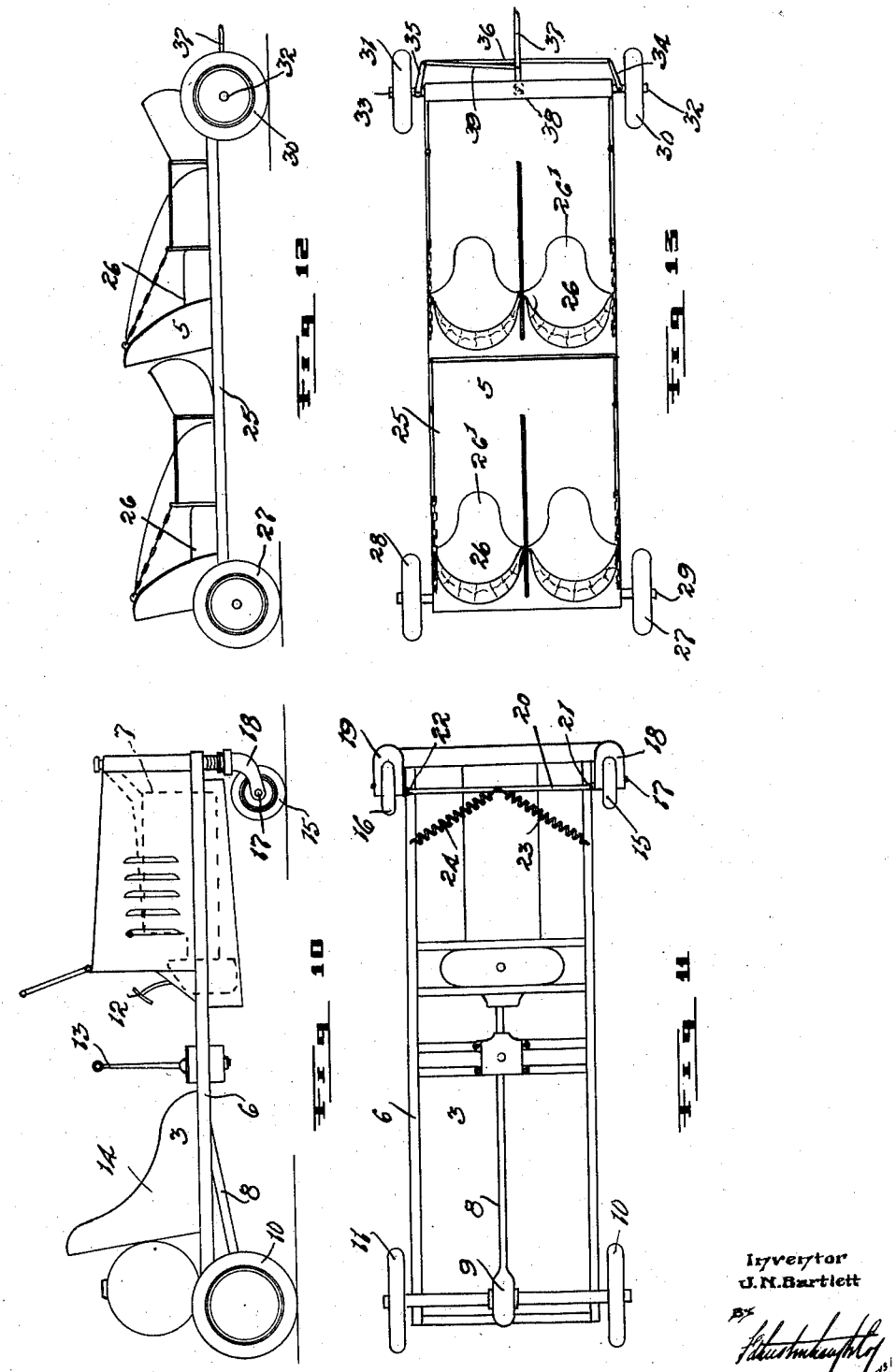

Patented Jan. 28, 1930

1,745,241

UNITED STATES PATENT OFFICE

JOHN N. BARTLETT, OF WINNIPEG, MANITOBA, CANADA

AMUSEMENT DEVICE

Application filed May 10, 1928. Serial No. 276,786.

The invention relates to improvements in amusements devices and an object of the invention is to provide an amusement device embodying a banked runway and driven wheeled passenger carriers for operating on the runway, the design of the runway and of the carriers being such that the carriers will be self steering throughout their entire course.

A further object of the invention is to provide a continuous banked runway and a driven or propelled passenger carrier for opearting on the runway, the carrier having forward castor wheels which in conjunction with the contour of the runway act to steer the carrier on the runway and whilst accommodating the varying velocities which the carrier may have in its movement on the runway.

A further object of the invention is to provide an amusement device embodying a continuous main runway for passenger carriers and a loading runway onto which any carrier can be passed to receive its load and where it can be loaded and then returned to the main runway and without interfering in any way with other passenger carriers operating on the main runway.

A further object of the invention is to provide a banked continuous main runway, a loading runway leading from and returning to the main runway and propelled self steering passenger carriers for operating on the runways, the carriers and the main runway being so designed that the carriers will be self steering and will retain their course on the main runway provided the velocity of the carrier is maintained above a selected velocity and such that should the velocity of the moving carrier be reduced below said selected selected velocity, the carrier will automatically steer itself out onto the loading runway.

A further object of the invention is to construct the main runway and the loading runway such that the loaded driven vehicle will steer itself onto the main runway from the loading runway and such that it will be self steering throughout its travel on the loading runway.

A further object of the invention is to provide a passenger carrying trailer which can be connected to the driven passenger carrier to be drawn thereby and which will be automatically steered in its movement over the main and loading runways by the driven carrier.

With the above more important and other minor objects in view which will become more apparent as the description proceeds, the invention consists essentially in the arrangement and construction of parts hereinafter more particularly described, reference being had to the accompanying drawings, in which:—

Fig. 1 is a plan view of the complete device.

Fig. 2 is an enlarged detailed cross sectional view at 2—2' Figure 1 and looking in the direction of the applied arrow.

Fig. 3 is an enlarged detailed vertical sectional view at 3—3' Figure 1.

Fig. 4 is an enlarged detailed vertical sectional view at 4—4' Figure 1.

Fig. 5 is an enlarged detailed vertical sectional view at 5—5' Figure 1.

Fig. 6 is an enlarged detailed vertical sectional view at 6—6' Figure 1.

Fig. 7 is an enlarged detailed vertical sectional view at 7—7' Figure 1.

Fig. 8 is an enlarged detailed vertical sectional view at 8—8' Figure 1.

Fig. 9 is an enlarged detailed sectional view at 9—9' Figure 1.

Fig. 10 is a side view of the passenger carrier.

Fig. 11 is an inverted plan view of the carrier.

Fig. 12 is a side view of the trailer.

Fig. 13 is a plan view of the trailer.

In the drawings like characters of reference indicate corresponding parts in the several figures.

In carrying out my invention, I employ a continuous main or working runway 1, a loading runway 2 leading from and returning to the main runway, a plurality of similar driven wheeled passenger carriers 3 and a loading platform 4. The driven passenger carriers can be coupled if desired to trailers 5 to increase the capacity of the device.

The driven carriers 3 are herein shown as simulating an automobile and the frame 6 thereof supports forwardly the customary automobile engine indicated generally by the reference numeral 7 and the engine drives in the usual manner through the transmission shaft 8 and differential 9 the rear driving wheels 10 and 11. The usual clutch pedal is indicated at 12 and the gear shifting lever at 13, the lever being within convenient range of the passenger or driver's seat 14.

The forward end of the frame is supported by similar castor wheels 15 and 16 mounted on short shafts 17 carried by swivelled forks 18 and 19. The forks are connected by a cross bar 20 pivotally fastened at 21 and 22 to the forks and springs 23 and 24 are secured centrally to the bar 20 and to the frame. The springs are not intended to prevent the castor wheels from turning freely when the carrier is operating on the runway as later described. Their function is to prevent the castor wheels from being to sensitive in their steering action.

The trailers employed will embody a suitable frame 25 supporting passenger seats 26, this frame being supported rearwardly by carriage wheels 27 and 28 rotatably mounted on the axle 29 and forwardly by steering wheels 30 and 31 mounted on pivoted spindles 32 and 33.

The spindles are provided with cranks 34 and 35 and the cranks are connected by a cross bar 36 pivotally attached thereto. A draw bar 37 is pivotally connected at 38 centrally to the front of the frame and can be fastened in any suitable manner centrally to the rear end of the propelled passenger carrier 3. A link 39 pivotally connects the draw bar 37 to one of the cranks and the arrangement is such that a lateral movement of the front end of the draw bar 37 will effect the positive steering of the wheels 30 and 31 and accordingly control the operation of the trailer over the runway later described. Several trailers can be connected together if desired and then coupled to the propelled carrier 3 and such will simply increase the capacity of the device.

The main runway on which the driven passenger carriers and the trailers are adapted to operate is herein shown in the form of a double ended loop, the semi-circular end portions 40 and 41 of which are connected by the side portions 42 and 43. The end portions 40 and 41 are banked and present a constant cross section of the form shown in Figures 3 and 4. The side portions connecting the end portions are also banked and gradually change from the cross sections shown in Figures 3 and 4 to those shown in Figures 5, 6, 7 and 8 and between the section points 7—7' and 8—8' and those 5—5' and 6—6', the cross sectional shape of the main runway changes to that shown in Figure 2.

The design of the main runway is such that the load propelled passenger carrier is self steering as it moves along the runway and further the design is such that if the velocity of the driven carrier be maintained above a selected velocity, the carrier will not move out onto the loading runway.

In other words, when the speed of travel of the propelled carrier is maintained above the selected velocity, it will pursue a course on the main runway as indicated by the dot and dash line A of the drawing. The castor wheels of the propelled vehicle during its movement on the main runway will be controlled by the forces acting, namely, the velocity at which the carrier is moving, the inclination or bank given the runway and the weight of the carrier and occupants and the result of these forces is the force acting to steer the carrier.

By observing the direction of travel of the dot and dash line A, it will be seen that the carriers operate on the outer sides of the main runway at the loops and swing across the main runway during their travel over the side portions thereof and travel for a short time on the banked inner sides of said side portions. Obviously the general contour of the main runway can be modified but it is necessary, however, that the banking of it at the various bends which may occur, has to be designed so that under the forces acting, the driven vehicle is steered in its course over such runway provided the velocity is maintained higher than a selected velocity.

The loading runway is herein shown as elevated between the points B and C Figure 1 and the crosssectional shape of it between these points is as shown in Figure 4. When the carrier is operating on this part of the loading runway, it is moving at a slow speed so that very little banking at the sides of the runway will be necessary to steer it. The loading runway gradually declines from the point B to the main runway and the cross sectional shape of the meeting runways in this location is best shown in the right hand side of Figure 2.

The entering end of the loading runway is given a slight dip at D so that the outer front castor wheel of the down moving driven vehicle will be turned outwardly and the vehicle will move in a direction lengthwise of the main runway instead of a course angularly thereacross as would otherwise occur.

Between the point E and the point C, the loading runway slopes gradually upwardly and the exit end F of the loading runway gradually merges with the main runway inwardly of the location E and the cross sectional shape at the point of merging is as best shown in the left hand side of Figure 2. A slight outward dip is given to the main runway at its outer side and as indicated by the reference character H and this dip is arranged so that the outermost castor wheel of a driven carrier advancing at a reduced speed will be turned outwardly by the dip and will accordingly leave the main runway and enter the loading runway.

The speed of travel of the driven carrier will be controlled by an attendant thereon in the well known manner and when the attendant or driver considers he has circled the main runway a sufficient number of times, he will reduce the speed of the vehicle in a location somewhat as indicated by the reference character K and immediately the speed drops, the vehicle will be steered in a path of travel somewhat as indicated by the dotted line N Figure 1. It is here emphasized that as long as the speed of travel of the vehicle is kept above a predetermined speed, it will continue circling the main runway, the path of travel being indicated by the dot and dash line A and that as soon as the speed is reduced below the predetermined speed aforesaid and somewhere in the neighborhood of the point K, the vehicle will take a course of travel as indicated by the dotted line N and will approach the dip H and will then steer itself out onto the loading runway.

Any carrier can be caused to move out onto the loading runway and without interfering in any way with any other carrier remaining on the main runway. The withdrawn carrier can be stopped adjoining the platform 4 and reloaded and can then be driven back onto the main runway, the operator exercising due care so as not to collide or interfere with any other carrier operating on the main runway.

I have herein shown the trailers as provided with four seats 26 arranged in front and rear pairs and each seat is designed to accommodate two passengers if desired. The seat presents a forward centrally located extension 26' and it is intended that one person sit well back on the main portion of the seat with their legs spread and the other person sit on the forward extension 26' between the legs of the rear person.

The banker sides of the main runway can have their upper edges inturned as indicated at 1' to positively guard against the carriers running off the runway and causing accident.

What I claim as my invention is:—

1. In an amusement device, in combination, a banked runway and a propelled wheeled passenger carrier operating on the runway, the banking of the runway and the wheels of the carrier being designed such that the moving carrier is self steering in its movement over the runway.

2. In an amusement device, in combination, a banked runway and a propelled passenger carrier having forward castor wheels, the amount of banking of the runway being such that the passenger carrier is self steering throughout its travel.

3. In an amusement device, in combination, a banked runway and a self propelled passenger carrier having forward castor wheels, the amount of banking of the runway being such that the passenger carrier is self steering throughout its travel.

4. In an amusement device, in combination, a continuous runway having bends therein and the bends banked and a self propelled passenger carrier provided with forward castor wheels, the amount of banking being such that the forces acting on the moving carrier operate to render the carrier self steering as it moves over the runway.

5. In an amusement device, in combination, a continuous runway embodying end loops and side portions connecting the loops, said loops and side portions being banked and a self propelled passenger carrier having forward castor wheels, the said banking of the runway being such that the moving carrier is self steering throughout its course on the runway.

6. In an amusement device, in combination, a continuous banked main runway, a loading runway having an entrance to and an exit from the main runway and a propelled passenger carrier having forward castor wheels, the banking of the main runway being such that the passenger carrier is self steering throughout its travel thereon and such that upon the speed of travel thereof being maintained above a selected speed, the said carrier will remain on the main runway and upon the speed of the carrier being reduced below said selected speed, will steer itself out through the exit to the loading runway.

7. In an amusement device, in combination, a continuous main runway, a loading runway having an entrance to and an exit from the main runway and a propelled self steering passenger carrier for operating on the runways, the said main runway being banked to cause the passenger carrier to steer past the exit and entrance points aforesaid when the carrier is moving at a relatively high speed on the main runway and to steer out onto the loading runway through the exit upon the speed aforesaid being reduced at a preselected point.

8. In an amusement device, in combination, a continuous banked main runway and a loading runway exterior thereof and having an entrance to and an exit from the main runway and said main runway being provided with an outward dip adjoining the exit to the loading runway.

9. In an amusement device, in combination, a continuous banked main runway and a loading runway exterior thereof and having an entrance to and an exit from the main runway and said main runway being provided with an outward dip adjoining the exit to the loading runway and an outward dip at the entrance of the loading runway to the main runway.

10. In an amusement device, in combination, a continuous banked main runway, a loading runway exterior to the main runway and having an entrance to and an exit from the main runway and a self propelled passenger carrier having forward castor wheels, said main runway being banked to cause the carrier to be self steering and to continue operating on the main runway upon the speed of travel of the carrier being maintained relatively high and to steer the carrier onto the loading runway through the exit aforesaid upon the speed of the carrier being reduced.

11. In an amusement device, in combination, a continuous banked runway, a propelled passenger carrier operating on the runway and provided with forward castor wheels, the amount of banking being such that the forces acting on the moving carrier operate to render the carrier self steering over the runway, and a trailer hitched to the carrier and provided with forward steering wheels steered by the movement of the carrier.

12. In an amusement device, in combination, a continuous banked runway, a propelled passenger carrier operating on the runway and provided with forward castor wheels, the amount of banking being such that the forces acting on the moving carrier operate to render the carrier self steering over the runway, a trailer following the carrier and provided with interconnected forward steering wheels and a draw bar connecting the trailer to the rear end of the carrier and controlling the movement of the trailer steering wheels.

Signed at Winnipeg this 23 day of April, 1928.

JOHN N. BARTLETT.